(12) United States Patent
Chapman et al.

(10) Patent No.: US 6,447,981 B1
(45) Date of Patent: Sep. 10, 2002

(54) METALLIZED AZO THIOETHER DYES

(75) Inventors: Derek D. Chapman; Csaba A. Kovacs, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 306 days.

(21) Appl. No.: 09/084,904

(22) Filed: May 26, 1998

(51) Int. Cl.$^7$ .................................................. G11B 7/24
(52) U.S. Cl. ......................... 430/270.16; 430/270.19; 430/945; 534/693; 534/703; 369/288; 428/64.8
(58) Field of Search ..................... 534/643, 703; 430/945, 270.16, 270.19; 369/288; 428/64.8

(56) References Cited

U.S. PATENT DOCUMENTS

| | | | |
|---|---|---|---|
| 4,425,422 A | * 1/1984 | Komamura et al. | 430/226 |
| 4,579,817 A | * 4/1986 | Bergthaller et al. | 430/223 |
| 4,906,498 A | * 3/1990 | Ichikawa et al. | 430/945 |
| 4,939,011 A | * 7/1990 | Takahashi et al. | 430/945 |
| 5,283,147 A | * 2/1994 | Johnston et al. | 430/109 |
| 5,389,419 A | * 2/1995 | Maeda et al. | 430/270.13 |
| 5,426,015 A | 6/1995 | Chapman et al. | 430/275 |
| 5,500,325 A | * 3/1996 | Chapman et al. | 430/270.16 |
| 6,270,943 B1 | * 8/2001 | Chapman et al. | 430/270.16 |

FOREIGN PATENT DOCUMENTS

EP 0053037 * 6/1982

* cited by examiner

Primary Examiner—Martin Angebranndt
(74) Attorney, Agent, or Firm—John R. Everett; J. Jeffrey Hawley

(57) ABSTRACT

Metallized azo thioether dyes having an azo group linking a substituted 3-hydroxypyridine nucleus to a phenyl nucleus are disclosed. The phenyl nucleus has an thioether substituent ortho to the azo group but does not have electron withdrawing substituents on the phenyl nucleus. The dyes are useful in optical recording elements.

10 Claims, 1 Drawing Sheet

METALLIZED AZO THIOETHER DYES

FIELD OF THE INVENTION

The present invention relates to dyes and optical recording elements generally and DVD optical recording elements in particular.

BACKGROUND OF THE INVENTION

Optical recording elements for recording and storing digital information are known. One of the currently popular optical recording element is the compact disc or CD. CDs and recordable CDs (CD-Rs) have transformed the personal entertainment, personal computer and data storage industries. CDs and CD-Rs have made it possible to store enormous amounts of music or data on inexpensive, reliable, mass produced media.

Digital Versatile Disc (DVD) and recordable DVD (DVD-R) optical recording elements are being developed. For reasons stated below these elements have significantly greater storage capacity than CDs.

In CDs and DVDs digital information is stored in the form of low reflective marks on an otherwise reflective background. In this format the optical information is in the form of read only memory or ROM. Optical information is not recorded in real time, but is produced by press molding. In a typical process a substrate is stamped with a master containing the digital information in an embossed form. The stamped substrate, bearing deformations caused by the embossed master, is coated with a reflective layer and then with a protective layer. In the stamped substrate areas having the deformations the reflectivity is lower than in undeformed areas.

DVD elements have significantly more stringent requirements than CDs. The recording wavelength is 635 nm instead of 780 nm; playback wavelengths are 635 nm and 650 nm instead of 780 nm; numerical aperture of the read head is 0.6 instead of 0.5; the track pitch is 0.8 $\mu$m instead of 1.6 $\mu$m and the minimum mark length is 0.44 $\mu$m instead of 0.83 $\mu$m. These changes increase the data storage capacity significantly. In DVD the thickness of the stamped substrate is only 0.6 mm instead of 1.2 mm. However a total substrate thickness of 1.2 mm is required to make DVD elements physically stiffer and the same dimension as the popular CDs. This makes them useful in the current population of DVD modified CD players. Generally this is satisfied by forming a laminate structure that includes a substrate on opposite sides of other DVD required layers. Each substrate may be stamped with stored information or only one is so stamped.

It is sometimes desirable to produce an optical recording element that can be recorded in real time. CD-R elements having this capability are known. Such elements have dye containing optical recording layers coated onto a grooved substrate. The recording layer is coated with a reflectivity layer and then a protective layer. Exposure of the element to a laser recording beam operating in the region of 780 nm forming a relatively low reflective mark.

U.S. Pat. No. 5,500,325 to Chapman et al. discloses dye mixtures for optical recording layers. The mixtures comprise metallized azo ether dyes and a second dye. U.S. Pat. No. 5,426,015 discloses optical recording layers comprising metallized azo dianions with two cationic dye counterions.

DVD-R elements are constructed and used similarly to CD-R elements. However in DVD-R elements the shorter recording and playback wavelengths necessitate the development of new and different dye based optical recording layers.

SUMMARY OF THE INVENTION

The present invention provides a metallized azo thioether dye having an azo group linking a substituted 3-hydroxypyridine nucleus to a phenyl nucleus wherein the phenyl nucleus has an thioether substituent ortho to the azo group but has no electron withdrawing substituents on the same phenyl ring.

The dyes have good recording sensitivity and excellent light and dark stability.

DETAILED DESCRIPTION OF THE INVENTION

Figure 1:
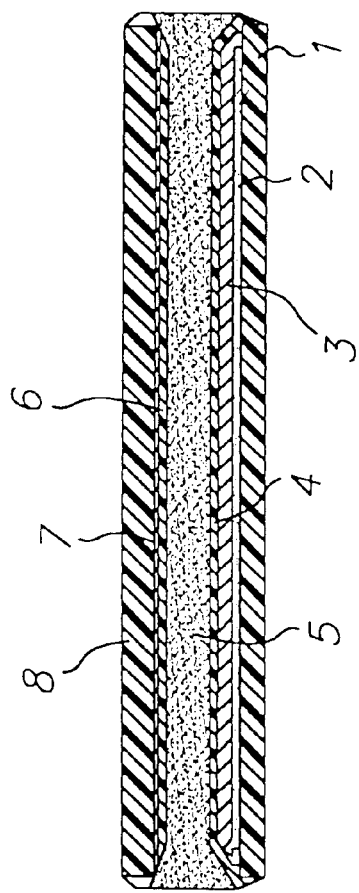
FIG. 1 presents a DVD optical recording element having a single optical recording layer.

Novel metallized azo thioether dyes included in this invention include those having the formula (I):

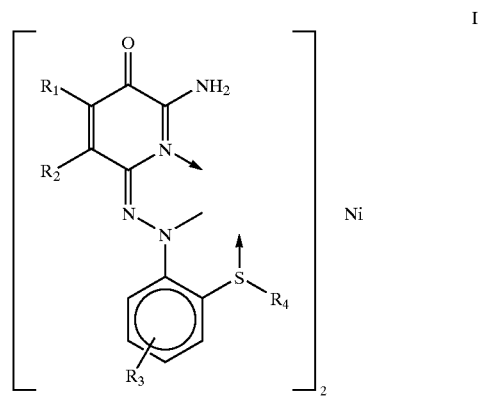

wherein;

$R_1$ represents hydrogen or an alkyl of from 1 to 6 carbons;

$R_2$ represents hydrogen, an alkyl of from 1 to 6 carbons or alkoxy with 1 to 10 carbons or halogen;

$R_3$ represents hydrogen, an alkyl of from 1 to 10 carbons or alkoxy with 1 to 10 carbons or halogen;

$R_4$ represents an alkyl of from 1 to 10 carbons, a substituted or unsubstituted benzyl; an aryl of from 6 to about 10 carbons or a hetaryl of from 5 to about 10 carbons;

$R_3$ cannot be an electron withdrawing group such as nitro or alkylsulfonyl

The general preparation of the dyes of this invention is illustrated by the following:

The Nickel Complex of 2-Amino-3-hydroxy-6-(2-{2-methoxyethylthio}phenylazo)pyridine 2-({2-Methoxyethylthio})aniline (0.77 g) was dissolved in a mixture of water (6 mL) and concentrated HCl (1.7 mL) and the solution cooled in ice. A solution of sodium nitrite (0.3 g) in water (2 mL) was added slowly and the mixture stirred for 1 hour. The diazonium solution was added to a cooled solution of 2-amino-3-hydroxypyridine (0.46 g) and sodium acetate (6 g) in methanol (40 mL). After 2 hours the reaction mixture was diluted with water and the product filtered off and washed with water. The dried dye was recrystallized from ethyl acetate. The yield was 0.89 g. of material having an nmr spectrum in agreement with the desired product. Conversion to the metallized dye was carried out by refluxing the above dye (0.7 g) with nickel acetate (0.28 g) in methanol (20 mL) for 4 hours. The solution was cooled and the product filtered off. The yield was 0.6 g. $\lambda$max 548 nm $\epsilon$=9.31×10$^4$.

Representative compounds within formula I are presented in Table 1:

TABLE 1

Metallized Azo Thioether Dyes

[Structure: pyridinone ring with R1, R2 substituents, NH2 group, C=O, N=N azo linkage to phenyl ring with R3 substituent, and S-R4 thioether, complexed with Ni in 2:1 ratio]

| Dye No. | $R_1$ | $R_2$ | $R_3$ | $R_4$ |
|---|---|---|---|---|
| 1 | H | H | H | $CH_3$ |
| 2 | H | H | H | $CH_2CH_3$ |
| 3 | H | H | H | $CH_2CH_2OH$ |
| 4 | H | H | H | $CH_2CH_2OCH_3$ |
| 5 | H | H | H | $CH_2CH_2CN$ |
| 6 | H | H | H | $(CH_2)_2\overset{O}{\overset{\|}{C}}N(H)(CH_2)_2CH_3$ |
| 7 | H | H | H | $(CH_2)_2\overset{O}{\overset{\|}{C}}OCH_2CH_3$ |
| 8 | H | H | H | $(CH_2)_7CH_3$ |
| 9 | H | H | H | $(CH_2)_2OCH_2CH_3$ |
| 10 | H | H | m-$OCH_3$ | $CH_3$ |
| 11 | H | H | p-$OCH_3$ | $CH_3$ |
| 12 | H | H | H | $CH_2\overset{O}{\overset{\|}{C}}N(C_4H_9)_2$ |
| 13 | H | H | H | $(CH_2)_2CH_3$ |
| 14 | H | H | H | $(CH_2)_3CH_3$ |
| 15 | H | H | H | $CH_2CH(CH_3)_2$ |
| 16 | $CH_3$ | H | H | $CH_2CH_3$ |
| 17 | $CH_3$ | H | H | $(CH_2)_2CH_3$ |
| 18 | H | $CH_2CH_3$ | H | $CH_2CH_3$ |
| 19 | $CH_2CH(CH_3)_2$ | H | H | $CH_2CH_3$ |
| 20 | H | H | m-$CH_2CH(CH_3)_2$ | $CH_2CH_3$ |
| 21 | H | H | m-$CH_3$ | $CH_2C_6H_5$ |

The indices of some metallized azo thioether dyes from Table 1 are listed in Table 2 below:

TABLE 2

Indices of the metallized azo thioether dyes

| Azo Dye No. | Index (n/k at 650 nm) |
|---|---|
| 3 | 2.39–0.17 i |
| 4 | 2.52–0.24 i |
| 5 | 2.52–0.24 i |

Optical Recording Elements

Broadly optical elements provided by the invention comprise a light transmitting, typically pregrooved substrate, a dye recording layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 400 and 660 nm. The substituents on the dye molecules are selected such that the real part of the complex refractive index (n) of the unwritten recording layer measured with a light source having a selected wavelength from 400 to 660 nm is greater than 1.8 and the imaginary part (k) is less than 0.3.

Several different layer configuration embodiments are possible for DVD optical recording elements. Two embodiments are presented in FIGS. 1 and 2.

In the FIG. 1 embodiment the DVD element comprises the following layer arrangement:

(a) a transparent grooved substrate (1) having a groove width of from 100 to 800 nm; a groove depth of 30 to 270 nm; and a groove pitch of 0.5 to 1.8 $\mu$m, usually 0.8 $\mu$m or below.

(b) an optical recording layer (2) comprising a metallized azo thioether dye having an azo group linking a substituted 3-hydroxypyridine nucleus to a phenyl nucleus wherein the phenyl nucleus has an thioether substituent ortho to the azo group wherein the recording layer. The unrecorded recording layer has a refractive index, at a selected wavelength from 645 to 655 nm, comprising a real part (n) greater than 1.8 and an imaginary part (k) less than 0.3.

(c) a light reflecting layer (3).

(d) a protective layer (4).

(e) an adhesive layer (5).

(f) a protective layer (6).

(g) a reflective layer (7).

(h) a substrate (8).

In the embodiment presented in FIG. 1 one or more of layers (d), (f) and (g) may be omitted.

Figure 2:
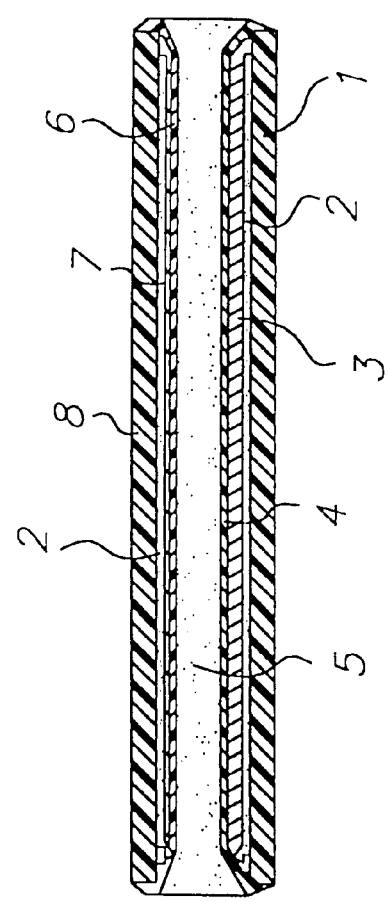
FIG. 2 presents a DVD optical recording element having two optical recording layers.

In the FIG. 2 embodiment the DVD element comprises the following layer arrangement:

(a) a transparent grooved substrate (1) having a groove width of from 100 to 800 nm; a groove depth of 30 to 270 nm; and a groove pitch of 0.5 to 1.8 μm, usually 0.8 μm or below.

(b) an optical recording layer (2) comprising a metallized azo thioether dye having an azo group linking a substituted 3-hydroxypyridine nucleus to a phenyl nucleus wherein the phenyl nucleus has an thioether substituent ortho to the azo group. The unrecorded recording layer has a refractive index, at a selected wavelength from 645 to 655 nm, comprising a real part (n) greater than 1.8 and an imaginary part (k) less than 0.3.

(c) a light reflecting layer (3).

(d) a protective layer (4).

(e) an adhesive layer (5).

(f) a protective layer (6).

(g) a reflective layer (7).

(h) an optical recording layer (2) comprising a metallized azo thioether dye having an azo group linking a substituted 3-hydroxypyridine nucleus to a phenyl nucleus wherein the phenyl nucleus has a thioether substituent ortho to the azo group. The unrecorded recording layer has a refractive index, at a selected wavelength from 645 to 655 nm, comprising a real part (n) greater than 1.8 and an imaginary part (k) less than 0.3.

(i) a transparent grooved substrate (8) having a groove width of from 100 to 800 nm; a groove depth of 30 to 270 nm and a groove pitch of 0.5 to 1.8 μm, usually 0.8 μm or below.

In some FIG. 2 embodiments one or both of the protective layers (d) and (f) may be omitted.

The substrate may be any transparent material that satisfies the mechanical and optical requirements. The substrates are generally pregrooved with groove depths from 20 nm to 250 nm, groove widths 0.2 to 1 mm and a pitch 0.5 to 2 mm particularly for CD-R. For DVD-R substrates the required groove specifications are mentioned in the description of FIGS. 1 and 2 above. The preferred material is polycarbonate, other materials are glass, polymethylmethacrylate and other suitable polymeric materials.

The preparation of the optical recording elements of the invention is achieved by spin coating of the dye mixture, with or without addenda, from a suitable solvent onto a transparent substrate. For coating, the dye mixture, with or without addenda, is dissolved in a suitable solvent such that the dye is 20 or fewer parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include alcohols, hydrocarbon halides, cellosolves, ketones. Examples of solvents are 2,2,3,3-tetrafluoropropanol, tetrachloroethane, dichloromethane, methyl cellosolve, ethyl cellosolve, 1-methoxy-2-propanol, 4-hydroxy-4-methyl-2-pentanone. Preferred solvents are alcohols since they have the least effect on the preferred polycarbonate substrates. Mixtures containing these solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum, copper and alloys thereof.

The protective layer over the reflective layer is similarly conventional for this art. Useful materials include UV curable acrylates.

An intermediate layer, to protect the metal layer from oxidation, can also be present.

In DVD elements the adhesives can be applied using screen printing, hot roller and spin coating methods. The adhesives to form the laminates include UV curable adhesives, hot melt adhesives, UV initiated cationic polymeric adhesives, pressure sensitive adhesives and acrylates.

The refractive index values for unrecorded recording layers were determined by coating a layer of the dye on a silicon wafer. The refractive index values (n and k) were measured by a Variable Angle Spectroscopic Ellipsometer (VASE) manufactured by J.A. Woollan Company.

The following examples demonstrate the recording sensitivity and light and dark stability of the optical recording layers provided by this invention.

For each of the dyes studied a complete DVD recording element according to FIG. 1 was prepared as presented in the examples.

EXAMPLE 1

In this example a DVD type optical recording element according to FIG. 1 was prepared and tested. A first assembly was prepared comprising, in the following order, substrate, recording layer, reflective layer and protective layer. The second assembly comprised, in the following order, a substrate, a reflecting layer and a protective layer. This first assembly was then laminated with an adhesive to the second assembly, protective layer to protective layer. The dye for the recording layer was selected from Table 1.

First Assembly

A polycarbonate substrate having a thickness of 0.6 mm, a diameter of 120 mm and a center hole diameter of 15 mm with a spiral groove on its surface with a width of 300 nm, a depth of 140 mn and a pitch of 0.8 mm, was made by injection molding.

To form the optical recording layer 1 part by weight of dye 3 was dissolved with ultrasound at room temperature in 1 hour in 50 parts of 2,2,3,3-tetrafluoropropanol by volume. The solution was filtered through a 0.2 μm filter. The solution was spin coated on the surface of the substrate to an overall optical density of 0.79 at 526 nm. The coating was dried at 60° C. for 30 minutes.

A gold reflective layer was deposited by a sputter process between 19.05 mm and 59.29 mm radii on the dye recording layer to about 40 nm thickness. For the deposition a Uniline 3000 made by First Light Technologies equipped with a Torus 10 DC magnetron source was used. Ionized argon gas was the gold carrier gas at 6000 WS (+/−1000) deposition energy level.

A protective layer (DaiNippon Daicure SD-220) was spin coated over the gold reflective layer to a thickness of 7 to 11 mm. The protective layer was UV cured by the Fusion F300 series cure station with an 'H+' bulb in 2.6 seconds.

Second Assembly

This assembly was prepared as in the first assembly using the substrate, reflective and protective layers.

The completed DVD element was prepared by laminating the first and second assemblies together through their respective protective layers. The laminate was formed by applying Sony SK7000 UV curable adhesive with an Autoroll 560 print head programmed for individual discs. The adhesive was silk-screened on to the protective layer of each assembly through a 305 mesh Kodak DOC (durable overcoat) silk-screen with a 90 durometer squeegee used at a 70 degree angle. Each assembly was UV cured at a rate of 10.7 meters per minute under a Fusion 450 UV lamp 25.4 cm "H" bulb. The two assemblies were mated adhesive to adhesive on a locating spindle and 35.6 N (8 pound force) was applied for 2 minutes. The thus formed DVD element was allowed to remain a rest on the spindle for 5 minutes (which resulted in about 90% cure). To be fully cured before testing, the DVD element was left to stand for 24 hours.

To test the DVD element a test system consisting of an optical head with a 635 nm laser, a 0.6 NA lens, push-pull tracking, and ½ aperture focusing was used. The optics used circularly polarized light to reduce laser feedback effects. Recording and play back were carried out with the same laser at 3.84 m/s rotational speed. The read power was kept at 0.5 mW. Single frequency marks were recorded with a 1.61 μm mark length at 8 mW write power thereby forming marks of lower reflectivity than the unmarked area when examined with a light source emitting at 635 mn light. When the marks were read with the read laser, through a 30 kHz bandpass filter centered at the mark carrier frequency for this recording layer, a CNR (carrier to noise ratio) of 51 dB was obtained.

EXAMPLE 2

In this example the same disk substrate solvent, solution concentration, filter, spin coater, drying conditions, gold deposition process, lacquer layer application, lamination and testing procedure were used as in the first example. Dye 4 was coated on the grooved surface of the substrate to an overall optical density of 0.51 at 526 nm. When written with 8 mW write power a 44 dB CNR was obtained on reading.

EXAMPLE 3

In this example the same disk substrate solvent, solution concentration, filter, spin coater, drying conditions, gold deposition process, lacquer layer application, lamination and testing procedure were used as in the first example. Dye 5 was coated on the grooved surface of the substrate to an overall optical density of 0.59 at 526 nm. When written with 6 mW write power a 44 dB CNR was obtained on reading.

EXAMPLE 4

In this example the same disk substrate solvent, solution concentration, filter, spin coater, drying conditions, gold deposition process, lacquer layer application, lamination and testing procedure were used as in the first example. Dye 6 was coated on the grooved surface of the substrate to an overall optical density of 0.55 at 526 nm. When written with 7 mW write power a 48 dB CNR was obtained on reading.

EXAMPLE 5

Light Stability

The selected dyes were spin coated on 5.08 by 5.08 cm (2 by 2 inch) polycarbonate slides. Optical density measurements were taken 5 mm from the edge of the slides with a Hewlett Packard 8450A Diode Array Spectrophotometer between 300 nm and 800 nm wave lengths. The slide was exposed through the polycarbonate for sixteen days by a method recommended by the inage Stability Technical Center for standard 50 klux Daylight exposure (ANSI IT9.9-1990 "Stability of Color Photographic Images" Section 5 Paragraph 5.6 Describes Simulated Indoor Indirect Daylight exposure). After sixteen days the optical densities were re-measured. To calculate the percent optical density loss, from the optical density value at λ-max before light exposure the optical density value after light exposure was subtracted. The resulting value was divided by the optical density value before light exposure and multiplied by one hundred. Results are presented in Table 3:

TABLE 3

Light Stability

| Dye No. | % Optical Density Loss After 16 days 50 Klux Light Exposure |
| --- | --- |
| 3 | 6.4 |
| 4 | 6.8 |
| 5 | 5.7 |
| 6 | 4.4 |
| 7 | 3.5 |

Table 3 shows the excellent light stability of the recording layers provided by the invention.

The invention has been described in detail with particular reference to certain preferred embodiments thereof, but it will be understood that variations and modifications can be effected within the spirit and scope of the invention.

What is claimed is:

1. An optical recording element having a transparent substrate and on the surface of said substrate, a recording layer, a light reflecting layer; wherein the recording layer comprises a metallized azo thioether dye having an azo group linking a substituted 3-hydroxypyridine nucleus to a phenyl nucleus wherein the phenyl nucleus has an thioether substituent ortho to the azo group and is free of electron withdrawing groups on the phenyl ring and has, when unrecorded, a refractive index at a selected wavelength from 400 to 660 nm, comprising a real part (n) greater than 1.8 and an imaginary part (k) less than 0.3.

2. An optical recording element having the following layer arrangement:
   (a) a transparent grooved substrate having a groove width of from 100 to 800 nm; a groove depth of 30 to 270 nm; and a groove pitch of 0.5 to 1.8 μm;
   (b) a recording layer (i) comprising a metallized azo thioether dye having an azo group linking a substituted 3-hydroxypyridine nucleus to a phenyl nucleus wherein the phenyl nucleus has an thioether substituent ortho to the azo group and is free of electron withdrawing groups on the phenyl ring (ii) having, when unrecorded, a refractive index at a selected wavelength from 400 to 660 nm, comprising a real part (n) greater than 1.8 and an imaginary part (k) less than 0.3;

(c) a light reflecting layer;
(d) an adhesive layer; and
(e) a substrate.

3. The element of claim 2 also comprising a protective layer between layers (c) and (d).

4. The element of claim 3 also comprising a protective layer between layers (d) and (e).

5. The element of claim 4 also comprising a reflective layer adjacent to layer (e).

6. The element of claim 3, having, between layers (d) and (e), the following additional layers in the recited order:
   a protective layer;
   a reflective layer; and
   a recording layer (i) comprising a metallized azo thioether dye having an azo group linking a substituted 3-hydroxypyridine nucleus to a phenyl nucleus wherein the phenyl nucleus has a thioether substituent ortho to the azo group and is free of electron withdrawing groups on the phenyl ring (ii) having, when unrecorded, a refractive index at a selected wavelength from 400 to 660 nm, comprising a real part (n) greater than 1.8 and an imaginary part (k) less than 0.3.

7. The element of claim 3 wherein the substrate has a thickness of 0.6 mm and a groove pitch of 0.5 to 1.0 μm.

8. The element according to any one of the claims 1–7 when the dye has a structure according to formula 1

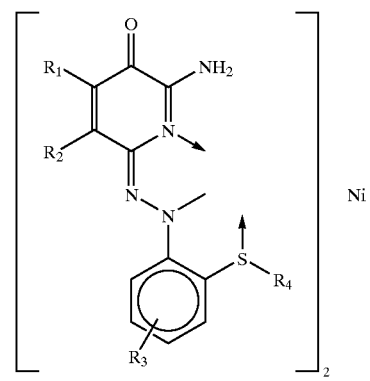

wherein;
   $R_1$ represents hydrogen or an alkyl of from 1 to 6 carbons;
   $R_2$ represents hydrogen, an alkyl of from 1 to 6 carbons or alkoxy with 1 to 10 carbons or halogen;
   $R_3$ is free of electron withdrawing groups and represents hydrogen, an alkyl of from 1 to 10 carbons or alkoxy with 1 to 10 carbons or halogen;
   $R_4$ represent an alkyl of from 1 to 10 carbons, a substituted or unsubstituted benzyl; an aryl of from 6 to about 10 carbons or a hetaryl of from 5 to about 10 carbons.

9. The element according to claim 8 when the dye is selected from Table 1.

TABLE 1

Metallized Azo Thioether Dyes

| Dye No. | $R_1$ | $R_2$ | $R_3$ | $R_4$ |
|---|---|---|---|---|
| 1 | H | H | H | $CH_3$ |
| 2 | H | H | H | $CH_2CH_3$ |
| 3 | H | H | H | $CH_2CH_2OH$ |
| 4 | H | H | H | $CH_2CH_2OCH_3$ |
| 5 | H | H | H | $CH_2CH_2CN$ |
| 6 | H | H | H | $(CH_2)_2\overset{O}{\overset{\|}{C}}N(H)(CH_2)_2CH_3$ |
| 7 | H | H | H | $(CH_2)_2\overset{O}{\overset{\|}{C}}OCH_2CH_3$ |
| 8 | H | H | H | $(CH_2)_7CH_3$ |
| 9 | H | H | H | $(CH_2)_2OCH_2CH_3$ |
| 10 | H | H | m-$OCH_3$ | $CH_3$ |
| 11 | H | H | p-$OCH_3$ | $CH_3$ |

TABLE 1-continued
Metallized Azo Thioether Dyes
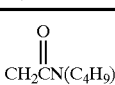
| Dye No. | R₁ | R₂ | R₃ | R₄ |
|---|---|---|---|---|
| 12 | H | H | H | $CH_2\overset{O}{\underset{\|}{C}}N(C_4H_9)_2$ |
| 13 | H | H | H | $(CH_2)_2CH_3$ |
| 14 | H | H | H | $(CH_2)_3CH_3$ |
| 15 | H | H | H | $CH_2CH(CH_3)_2$ |
| 16 | $CH_3$ | H | H | $CH_2CH_3$ |
| 17 | $CH_3$ | H | H | $(CH_2)_2CH_3$ |
| 18 | H | $CH_2CH_3$ | H | $CH_2CH_3$ |
| 19 | $CH_2CH(CH_3)_2$ | H | H | $CH_2CH_3$ |
| 20 | H | H | m-$CH_2CH(CH_3)_2$ | $CH_2CH_3$ |
| 21 | H | H | m-$CH_3$ | $CH_2C_6H_5$. |
10. The element according to claim 9 wherein the dye is selected from dyes 3, 4, 5, 6 and 7 of Table 1 recited in claim 9.
\* \* \* \* \*